(12) United States Patent
Agrawal et al.

(10) Patent No.: US 8,115,984 B2
(45) Date of Patent: Feb. 14, 2012

(54) LAMINATED ELECTROCHROMIC DEVICES AND PROCESSES FOR FORMING THE SAME

(75) Inventors: Anoop Agrawal, Tucson, AZ (US); Juan Carlos L. Tonazzi, Tucson, AZ (US); Lori L. Adams, Tucson, AZ (US); John P. Cronin, Tucson, AZ (US)

(73) Assignee: AJJER LLC, Tucson, AZ (US)

( * ) Notice: Subject to any disclaimer, the term of this patent is extended or adjusted under 35 U.S.C. 154(b) by 96 days.

(21) Appl. No.: 12/140,054

(22) Filed: Jun. 16, 2008

(65) Prior Publication Data

US 2008/0310007 A1    Dec. 18, 2008

Related U.S. Application Data

(60) Provisional application No. 60/936,065, filed on Jun. 18, 2007, provisional application No. 60/998,758, filed on Oct. 13, 2007.

(51) Int. Cl.
    *G02F 1/15*    (2006.01)
(52) U.S. Cl. ................................... 359/265
(58) Field of Classification Search ........ 359/265–275; 345/49, 105; 348/817
    See application file for complete search history.

(56) References Cited

U.S. PATENT DOCUMENTS

| | | |
|---|---|---|
| 3,280,701 A | 10/1966 | Donnelly et al. |
| 4,712,879 A | 12/1987 | Lynam et al. |
| 4,841,058 A | 6/1989 | Endo et al. |
| 4,902,108 A | 2/1990 | Byker |
| 5,007,718 A | 4/1991 | Minoura et al. |
| 5,140,455 A | 8/1992 | Varaprasad et al. |
| 5,724,187 A | 3/1998 | Varaprasad et al. |
| 5,910,854 A * | 6/1999 | Varaprasad et al. .......... 359/273 |
| 6,039,390 A | 3/2000 | Agrawal et al. |
| 6,154,306 A * | 11/2000 | Varaprasad et al. .......... 359/273 |
| 6,157,480 A | 12/2000 | Anderson et al. |
| 6,172,794 B1 | 1/2001 | Burdis |
| 6,178,034 B1 | 1/2001 | Allemand et al. |
| 6,241,916 B1 | 6/2001 | Claussen et al. |
| 6,266,177 B1 | 7/2001 | Allemand et al. |
| 6,317,248 B1 | 11/2001 | Agrawal et al. |
| 6,361,709 B1 | 3/2002 | Bauer et al. |
| 6,369,935 B1 | 4/2002 | Cardinal et al. |
| 6,373,618 B1 | 4/2002 | Agrawal et al. |
| 6,420,036 B1 | 7/2002 | Varaprasad et al. |
| 6,449,082 B1 | 9/2002 | Agrawal et al. |
| 6,475,663 B1 | 11/2002 | Mohwald et al. |
| 6,493,128 B1 | 12/2002 | Agrawal et al. |
| 6,528,782 B1 | 3/2003 | Zhang et al. |
| 6,594,066 B2 | 7/2003 | Lomprey et al. |
| 6,639,708 B2 | 10/2003 | Elkadi et al. |
| 6,767,624 B2 | 7/2004 | Bronstert |
| 6,795,226 B2 | 9/2004 | Agrawal et al. |
| 6,816,298 B2 | 11/2004 | Nishikitani et al. |

(Continued)

FOREIGN PATENT DOCUMENTS

WO    WO 2008037643    4/2008

*Primary Examiner* — Joseph P Martinez

(74) *Attorney, Agent, or Firm* — Lawrence R. Oremland, P.C.

(57) ABSTRACT

This invention discloses pre-formed electrochromic films that are used in assembly of electrochromic devices. These films are laminated to conductive substrates to form the electrochromic devices. The invention also discloses optical characteristics of the substrates for imparting durability to the electrochromic devices from solar radiation.

10 Claims, 6 Drawing Sheets

U.S. PATENT DOCUMENTS

| | | |
|---|---|---|
| 6,961,168 B2 | 11/2005 | Agrawal et al. |
| 6,995,891 B2 | 2/2006 | Agrawal et al. |
| 7,064,212 B2 | 6/2006 | Burrell et al. |
| 7,118,694 B2 | 10/2006 | Bronstert et al. |
| 7,138,181 B2 | 11/2006 | McCurdy et al. |
| 7,154,657 B2 | 12/2006 | Poll et al. |
| 7,450,292 B1 | 11/2008 | Burrell et al. |
| 2002/0012155 A1 | 1/2002 | Baumann et al. |
| 2006/0027260 A1 | 2/2006 | LeCompte et al. |
| 2006/0159610 A1 | 7/2006 | Stenzel et al. |
| 2007/0049155 A1 | 3/2007 | Moro et al. |
| 2007/0074316 A1 | 3/2007 | Alden et al. |
| 2007/0097481 A1 | 5/2007 | Burdis et al. |
| 2007/0103761 A1 | 5/2007 | Giron et al. |

\* cited by examiner

LAMINATED ELECTROCHROMIC DEVICES AND PROCESSES FOR FORMING THE SAME

RELATED APPLICATION/CLAIM OF PRIORITY

This application is related to and claims priority from U.S. Provisional application 60/936,065 filed on Jun. 18, 2007 and U.S. provisional patent application 60/998,758 filed on Oct. 13, 2007, both of which are incorporated by reference herein.

FIELD OF THE INVENTION

The present invention relates to forming electrochromic (EC) devices particularly usable for window applications for architectural, transportation, display and other applications.

BACKGROUND OF THE INVENTION

The present invention relates to electrochromic devices for varying the transmittance or reflection to light, such as windows for buildings, transportation (e.g., motor vehicles, buses, trains, planes, boats). Devices from this invention may also be used for displays (including indicators), and rear-view mirrors for vehicles, motor cycles, etc.

Reversibly variable electrochromic devices are known in the art. In such devices, the intensity of light (e.g., visible, infrared, ultraviolet or other distinct or overlapping electromagnetic radiation) is modulated by passing the light through an electrochromic medium. The electrochromic medium is disposed between two conductive electrodes, at least one of which is typically transparent, and causes the medium to undergo reversible electrochemical reactions when potential differences are applied across them. The electrochromic devices may be divided in two distinct types. In one, a stack of thin films is used on a single substrate that comprises of all the transparent conductors, electrolyte and other electrode layers. Examples of these devices are in US patent applications 2007/0097481 and 2007/0103761. In the other type of EC devices two substrates are used, which have pre-deposited layers of conductors and may also have other pre-deposited redox electrode layers in addition to the conductors. These substrates are put together as a sandwich where the center is a liquid or a polymeric solid electrolyte. Examples are described in U.S. Pat. Nos. 3,280,701; 4,712,879; 4,902,108; 5,007,718; 6,178,034 and 6,266,177. Electrochromic materials in this invention are those that change color when oxidized or reduced.

For EC windows it is desired that the devices have good memory, this means once the window is colored or bleached, it remains in that optical state for a long period of time with minimum or no power, i.e., their power consumption is low to keep the desired optical state or one may be able to power the device intermittently without changing the transmission too much from the desired value. Such devices, with good memory, usually employ additional electrochromic and/or ion storage coatings on the substrates which are laminated with an ion conducting (or an electrolyte) layer as described in U.S. Pat. Nos. 6,266,177; 6,172,794 and US patent application 2006/0159610. In these devices, the added processing operations related to additional coatings deposition, their etching and reduction of at least one layer (if used) adds to the cost.

Devices with a sequence of thin coatings on a single substrate are also expensive to produce, particularly with increasing area. First, such all thin film stacks are sensitive to yield due to defects in thin coatings and, second, the deposition of layers by physical vapor deposition (PVD) is expensive as many of these layers are thick and are typically in the range of 300 to 1000 nm. Further, many of these devices need additional layers to reduce shorting and may also require additional processing steps for ion intercalation (e.g., see US patent application 2007/0097481).

To reduce cost of EC devices it is desirable to produce components using mass scale production methods. One method is to use a lamination process. This is a standard method where a polymeric sheet is laminated to a substrate. This method is well understood and is widely available. For example, laminated glass is available in a price range acceptable to end-customers for use in scatter (or shatter) resistant glass in climates where large wind loads are expected, and in automotive industry these windows reduce outside noise, and in case of windshields all cars in U.S. are required to only use laminated glass by the Federal Motor Vehicle Safety Standards. One way of implementing this procedure to manufacture EC devices cost effectively is to produce a solid laminating film with all the EC characteristics using mass processes such as extrusion and casting. The conductive substrates are being produced in large sizes and volumes for many other applications which may be used for these devices.

Glass with transparent conductive coatings, for example, fluorine doped tin oxide, is available from a variety of sources at a reasonable price (e.g., from Pilkington (Toledo, Ohio) as TEC 15, TEC 8). These and other conductors such as ITO and others are also available in large sizes due to the demands faced by flat panel display and solar cell industry on large coated substrates. For mirrors one may also use metal coatings on substrates as one of the conductive electrode layers. Particularly electrochromic rear-view mirrors for vehicles and windows for aircrafts and vehicles which are bent could be produced by laminating an electrolyte sheet between two appropriately bent substrates. It will be desirable to make solid EC devices using the lamination process without having to further coat the conductive substrates with any additional electrode layers.

SUMMARY OF THE PRESENT INVENTION

In accordance with the purposes of the present invention, as embodied and broadly described herein, the present invention provides materials and methods of forming cost-effective laminated EC devices. This includes composition and preparation of solid electrochromic polymeric sheets that are laminated to conductive substrates to form such laminated devices.

Another objective of the invention is the use of substrates and materials that block part of the visible radiation in order to enhance the durability of windows to solar radiation.

DETAILED DESCRIPTION

Figure 1:
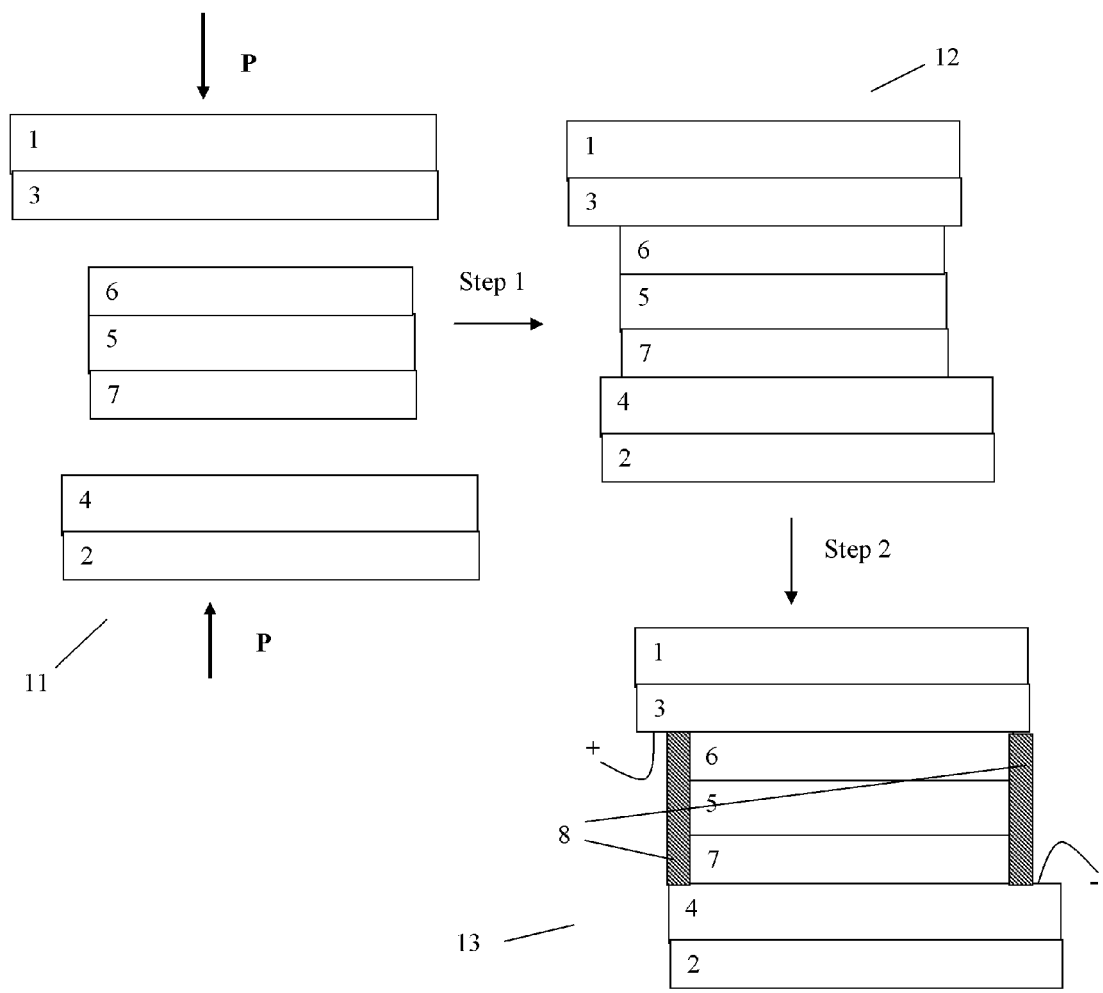
FIG. 1: Shows fabrication process of an EC device by the inventive method.

In EC devices, particularly used for large area windows and large displays, it is important that the devices have good memory. This allows devices to color uniformly and deeply without high charge consumption or a large voltage drop. Further, it also helps in reducing the energy consumed by such devices, particularly if these are supposed to reside in dark and transparent states for long periods of time. In the automotive industry, the power available to run the gadgets while the vehicle is parked is small, thus it is preferred that the desired state of the EC window selected by the user be maintained without consuming any significant power. It would be desirable to have the same for any type of transportation (buses, planes, boats, etc.) to not draw any power or low power to be able to shade the interiors from the Sun while parked for long periods. In addition, when the user commands a change in the window transmission, it should respond rapidly. For certain windows, to meet safety considerations it may be desirable that they self bleach upon the removal of power in a reasonable time.

Typically good memory in EC devices means to hold within 5% of any desired state of transmission without applying power preferably for a long period. For transportation the window temperature during normal operation may vary from $-40°$ to about 85° C., and for architectural windows this variation is typically from about $-40°$ to 60° C. This holding period at typical use temperature is preferably from a few minutes at the use temperature, to several hours or more depending on the application. For automotive glazing applications at room temperature, this should preferably exceed 2 hours. Usually, the memory period decreases with increasing temperature. Thus the ability of the EC window to hold the desired transmission when evaluated at the upper limits of these temperature ranges may be shorter. The presence of memory allows one to design power supplies to hold the windows in desired transmission states for longer time by only providing a trickle charge which may also be derived from a solar cell. Another way to quantify the memory is by measuring the leakage current. The leakage current is measured as the steady state current while a voltage is applied to hold at the desired coloration level. Typically this current is measured in the deepest state of coloration specified for the operation of the device. This current changes with temperature and usually increases with increasing temperature. It should be measured at the upper use temperature, which for automotive glazing is 85° C. and building glazing is 60° C., and should be less than 2 $\mu A/cm^2$ of the active EC area, or preferably less than 0.5 $\mu A/cm^2$ and most preferably less than 0.05 $\mu A/cm^2$. In terms of power, most EC devices switch completely in a range of 1 to 3V. One may specify this also in terms of power consumption which should be less than 5 $\mu W/cm^2$, or preferably less than 1.2 $\mu W/cm^2$ or most preferably less than 0.12 $\mu W/cm^2$. A fast change from one optical state to the next is preferred which may range from a fraction of a second (for some displays) to a few minutes (less than 5 minutes for windows) for most applications. This change rate depends on the size of the window, and it decreases with increasing size while holding all other parameters constant. For self-bleach devices, the leakage current is higher. However, there is no clear value above which the device can be always called self-bleaching and below that value considered as having good memory, as it depends on the application. For windows one may use a leakage current in excess of 20 $\mu A/cm^2$ as one that self-bleaches, or more preferably in excess of 100 $\mu A/cm^2$ as being characterized as self bleaching window.

In prior art there are several examples where laminatable electrolytes were used to produce EC windows. Some of these are U.S. Pat. Nos. 6,361,709; 6,475,663; 6,767,624, 7,118,694; 6,995,891, 6,639,708; and US patent application 2006/0159610. All of these describe electrolyte compositions, electrolyte thicknesses, adhesion promotion to the coated substrates, methods of making, mechanical and ionic properties, processes to form EC devices and perimeter sealing of such devices. However, many of the issues identified in these patents such a compositions of electrolytes, processing methods and sealing are applicable to this invention as well, thus all of these publications are incorporated herein by reference. In the present invention, the EC layers are prepared by adding additional components to the electrolytes identified in the above inventions, and processed using similar lamination processes.

In this invention, a single pre-formed homogenous film of the electrolyte with EC characteristics, or a multiple layer pre-formed film may be used which in addition to the ion-conduction layer (traditional electrolyte layer in solid devices) also comprises of at least one additional redox layer, preferably two additional layers i.e., anodic and cathodic redox layers.

In prior art (references listed above), coatings were used to impart separate cathodic and anodic characteristics to window devices. Such coatings were deposited on the substrates, and then laminated with an ion conducting layer. In this invention such characteristics are provided into a pre-formed laminating film which has electrolytic characteristics and also distinct anodic and cathodic layers. In another set of prior art devices, the cathodic and anodic materials are mixed with the electrolyte (for example, see U.S. Pat. Nos. 4,902,108; 5,140, 455, 6,241,916; 6,961,168) and filled as liquids into a pre-fabricated empty cavity with conductive coatings. These devices primarily yield self-erasing or self-bleaching characteristics, i.e. they automatically bleach in a short time after the removal of power (from a few seconds to a few minutes). In the present invention a single layer film is pre-formed with both electrolytic and EC characteristics which is then laminated to the conductive substrates. In both types of devices additional layers such as those that promote adhesion to the substrates or provide added functionality may be applied on to the surfaces of these films or on to the substrates before lamination. The important aspect of this invention is to understand the novelty that a film is pre-formed with both electrolytic and electrochromic functions which is then laminated with conductive substrates to yield an electrochromic device. In all cases this will be referred as pre-formed solid EC film that is further processed by laminating to the conductive substrates to form an EC device. The layers of the laminatable film described above may also be prepared separately and then bonded together as a solid film prior to laminating them to the substrates, or all of these discrete layers may be individually placed between the substrates and laminated together.

In the innovation described here, the laminatable solid EC film is fabricated in several ways. For memory devices, this film has multiple layers, preferably three layers, one anodic, one cathodic and in between these two layers is an electrolyte layer. At least one of the redox species used in this film, i.e., anodic or the cathodic species has to be electrochromic. It is desirable that the anodic and the cathodic layers also have high ion conductive properties. This composite film may be prepared in any fashion, but it is preferably prepared in a cost effective way in large quantities such as in one continuous co-extrusion or a casting or any other type of operation, where each of the layer is formed separately and combined into one layer. In another method, the anodic and the cathodic species (where either one or both type may be electrochromic) are diffused in from the two faces of an electrolyte sheet resulting in anodic and cathodic bands separated by an electrolytic band across the cross-section of this sheet. Yet in another method, an electrolyte sheet may be coated by a spray or a printing process with compositions of anodic materials on one side and cathodic compositions on the other side. In yet another method a solid electrolyte layer is pulled through a liquid bath composition comprising the redox species. The above described diffusible, printable, sprayable or the bath compositions may also have solvents, monomers, and electrolytic components (plasticizers, ionic liquids, salts and polymers) which also deposit on the traveling electrolytic sheet. The dyes may be pre-attached to the polymers in this liquid medium so that they are not able to diffuse deeply in the electrolyte layer and are then dried to remove any solvent that may have been used to impart a desirable viscosity during processing. Alternatively, as the dye laden electrolyte sheet is pulled out, the monomers and/or the dye are polymerized by heat or radiation or react with the electrolytic sheet. Particularly preferred materials for this construction where an electrolyte sheet is pulled through a bath are those solutions that comprise bridged dyes (i.e., a dye having both anodic and cathodic character) so that the same layer may be deposited on both sides. Further, the pre-formed sheets may have more than one anodic and/or cathodic material so that the color or kinetic of the device could be tailored. The preformed sheet may be made so that two releasable layers are placed on either side of it in order to protect this sheet while it is stored or transported. For further protection such sheets may also be placed in bags that are evacuated and then sealed. These release layers and bags may be made out of plastic or metal foils, or plastic coated with metals. Metals and metal coatings will impart superior permeability resistance against oxygen, water and also against light.

The multilayered film to be used for lamination may be cut to size and stored as sheets or rolls that may be later cut to size for lamination. During the processing of these films, an inert atmosphere may be required, particularly when the processing is done at elevated temperature. These layers may be thermoplastic, or thermoset or combination of the two (i.e. partially cured or "b" staged). Before the final EC device assembly, this multilayered structure largely possesses thermoplastic characteristics or has a flowable component so that flowability and good adhesion to the substrates is obtained. During or after the lamination process additional reactions can take place which may cure the film, bind some of the components to the film, etc. These reactions may be triggered by heat or additional radiation processes (such as UV exposure).

For compatibility, all the layers of the composite film may comprise the same or different materials (other than the anodic and cathodic dyes). These materials are polymers, monomers, catalysts, initiators, plasticizers, salts (including ionic liquids), UV stabilizers, viscosity modifiers, etc. These materials may be in the same proportion or in a different proportion for the various layers. The mechanical and ionic properties of these layers may be similar or different. Similar compositions, particularly in terms of the polymers and the plasticizers used promote compatibility and good adhesion between these layers. Once an EC laminate is formed using a pre-formed layer and the substrates, this laminate may be subjected to a radiation (e.g., UV) and/or heat treatment so that further polymerization and/or crosslinking may occur. The extent of polymerization/cross-linking may be different in different layers, or may be none in some of the layers.

Some of the polymers that form the pre-formed layers may be chosen from acrylics (including methacrylics, e.g., polymethylmethacrylate, polyhexylacrylate, polyether acrylates), polyvinylidene fluoride, fluorinated ethylene propylene, polyvinyl acetate, polyvinyl alcohol, polyvinylbutyral, poly vinyl formal, polyurethane, epoxy, silicone, polysulfide, polyethers (e.g., polyethylene oxide and polypropylene oxide) and copolymers comprising these. It is also possible to give a body to these laminates using fillers that result in high thixotropy, e.g., particles smaller than 20 nm such as fumed silica (see U.S. Pat. No. 6,361,709). For ionic materials used in these layers (e.g., cathodic dyes, bifunctional dyes, ionic liquids, salts, or nano-particles with surface attached ionic species) it is preferred that their anions be similar to impart good compatibility. Further, to ensure that these devices are long lasting and have low sensitivity to moisture, the most preferred anions for any of the ionic components are bis(trifluoromethylsulfonyl)imide $((CF_3SO_2)_2N^-)$, bis(perfluoroethylsulfonyl)imide $((CF_3CF_2SO_2)_2N^-)$ and tris(trifluoromethylsulfonyl)methide $((CF_3SO_2)_3C^-)$, tris pentafluoroethyl-trifluoro phosphate $(PF_3(C_2H_5)_3^-)$. Non fluorine containing anions, for example alkyl sulfate (e.g. $C_2H_5SO_4^-$) and tetracyanoborate may also be used. To ensure that the solvents have a large electrochemical window and permanency it is preferred that hydrophobic ionic liquids are used as plasticizers. Due to the low vapor pressure of these ionic liquids, these do not migrate or vaporize with time which could lead to change in the device performance or even in the pre-formed film as it is stored prior to assembly. The preferred anions of the ionic liquid are the ones listed above, and the preferred cations include quaternary ammonium, where more preferred quaternary ammonium cations are pyridinium, pyridazinium, pyrrolidinium, pyrimidinium, pyrazinium, imidazolium, pyrazolium, thiazolium, oxazolium, triazolium, tetraalkylammonium, N-methyl morpholinium, cations of the formula $[(CH_3CH_2)_3N(R_1)]^+$, wherein $R_1$ is alkyl having 2-10 carbons, cations of the formula $[(CH_3)_2(CH_3CHCH_3)N(R_2)]^+$, wherein $R_2$ is alkyl having 2-10 carbons, cations having the structural formula

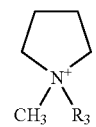

wherein $R_3$ is alkyl having 2-10 carbons, and cations having the structural formula wherein $R_4$ is alkyl having 2-10 carbons.

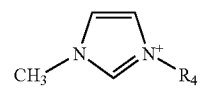

Any of the solvents in the U.S. Pat. Nos. 4,902,108, 6,594,066; 5,140,455; 7,064,212 may be used as non-ionic plasticizers, however the preferred ones are organic carbonates such as propylene carbonate, γ-butyrolactone, sulfolane and phosphates. These plasticizers may be used along with the ionic liquids or without them. Further, the electrolyte layer may only allow transport of non-electrochromic anions and cations such as $Li^+$, $Na^+$, $K^+$, $Ca^+$ and anions such as $ClO_4^-$, $BF_4^-$, $CF_3SO_3^-$, $N(CF_3SO_2)_2^-$ (NTF or imide), $(CF_3CF_2SO_2)_2N^-$, $(CF_3SO_2)_3C^-$, $AsF_6^-$, $PF_6^-$, $Cl^-$, $Br^-$, tris pentafluoroethyl-trifluoro phosphate (FAP, $PF_3$ $(C_2H_5)_3$). alkyl sulfate (e.g. $C_2H_5SO_4^-$) and tetracyanoborate, etc. These ions may also be transported through the anodic and the cathodic layers to provide electrical neutrality. The electrolyte layer in the center of a 3-layer multilayer construction may be a membrane that allows ionic conduction but limits the conduction of the electrochromic anions and cations (e.g., ions of bipyridinium, ferrocene, and phenazine, etc.). This limitation may be due to the large size of such ions. As described later such ions may be bonded to polymeric chains or other particles to increase their size and hence decrease their mobility through the electrolyte layer.

The anodic or the cathodic character to the layer is preferably imparted by putting appropriate EC dyes and/or redox materials in these layers. Each layer may comprise of more than one dye to give the desired color or other characteristics to the device. As an example, the cathodic layer may comprise of bipryidinium salts (viologens) and the anodic layer may comprise of ferrocenes and phenazines. Description of several anodic and cathodic compounds is given in U.S. Pat. Nos. 4,902,108, 6,594,066; 5,140,455; 7,064,212, each of which is included herein by reference. It is preferred that such anodic and cathodic compounds be attached to the polymeric material or nano-particles in these layers so that their mobility across the electrolyte layer is reduced or eliminated, or alternatively, the electrolyte layer in the center should be such that it preferably does not transport electrochromic ions. It is not necessary to add cathodic dye to the cathodic layer and an anodic dye to the anodic layer. One may add bridged dyes to any of these which may have both anodic and cathodic characters. If the bridged dye is added to both the layers, it is only the applied potential polarity in the device which would dictate whether a layer is used as a cathodic layer or as an anodic layer. Many bridged dyes, such as given in the U.S. Pat. Nos. 6,241,916; 6,816,298; 6,961,168; U.S. patent application Ser. No. 11/526,416 are also incorporated by reference herein, some exemplary combinations of bridged dyes with anodic and cathodic characters are viologens bonded to phenazines (or other aryls), viologens bonded to ferrocene, metal-arene complexes, charge transfer compounds, or one or more cathodic moieties bonded to multiple anodic moieties, etc. Electrochromic compounds of the invention also include bifunctional redox dyes having a redox active cathodic moiety that provides the dye with its color properties, and a redox active metal species such as titanium (III), titanium (IV), vanadium (III), vanadium (IV), vanadium (V), iron (II), iron (III), cobalt (II), cobalt (III), copper (I), copper (II), silver (I), silver (II), indium (I), indium (III), tin (II), tin (IV), antimony (III), antimony (V), bismuth (III), bismuth (V), cerium (III), cerium (IV), samarium (II), samarium (III), dysprosium (II), dysprosium (III), ytterbium (II), ytterbium (III), europium (II), europium (III). Bifunctional redox dyes of the present invention that are in the form of metal-arene complexes have the formula $$[Cat_1][M]$$

where M is a metal salt that includes a metal such as titanium (III), vanadium (III), vanadium (IV), iron (II), cobalt (II), copper (I), silver (I), indium (I), tin (II), antimony (III), bismuth (III), cerium (III), samarium (II), dysprosium (II), ytterbium (II), or europium (II).

The dyes (cathodic, anodic or cathodic+anodic) may be further attached to molecular energy receptors so that these are stable to UV light (e.g. in US patent application 2002/0012155). These may be molecules or may be nanoparticles of UV absorbing semi-conducting materials such as titania, cerium oxide and zinc oxide. This can impart high UV stability to the system by providing a linked energy receptor. These layers may also have additional nano-particles (including fumed silicas, silsesquioxanes and titania) to provide viscosity and/or UV shielding characteristics. These nanoparticles may also be coated with non-active oxides such as silica, alumina, zirconia and their mixtures (coating is generally about 5-20% of the total thickness or the diameter of the nano-particle). Some of the other preferred nano-particles comprise of silica, silsesquioxanes and tantalum oxide. The particle size of these materials is typically less then 200 nm and preferably less than 100 nm. The attachment of the dyes to the nano-particles is through the functional groups on the surface of such particles. Making of nano-particles and their surface functionalization to be compatible for attachment to polymers or dyes is described in provisional U.S. patent application Ser. No. 60/934,247, filed on Jun. 12, 2007, and U.S. patent application Ser. No. 12/136,407 filed on Jun. 10, 2008 (claiming the priority U.S. provisional 60/934,247), each of which is included herein by reference. One may also use conductive nano-particles such as those comprising indium, tin, zinc and antimony oxides as long as these do not cause an electrical short within the device. For windows one may use dyes that color in the near infra-red so that wider amount of solar energy can be attenuated. Examples of such dyes are described in U.S. Pat. No. 6,193,912.

The anodic and the cathodic materials are not limited to small dye molecules. These may comprise polymeric electrochromic materials or even nano-particles of inorganic materials comprising electrochromic metal oxides and prussian blue. The preferred size of the nano-particles is smaller than 300 nm for clear EC devices, and preferably less than 200 nm, and most preferably less than 100 nm. Examples of electrochromic polymers are polyaniline, polythiophene, polypyrrol and their derivatives. Examples of metal oxides are those comprising tungsten oxide, molybdenum oxide, vanadium oxide, nickel oxide and iridium oxide. The anodic and the cathodic layers may have more than one type of electrochromic materials chosen from the several described above. These polymers or nano-particles are preferably functionalized so that they may be attached to more compatible polymers to make them easily miscible within the anodic and the cathodic layers.

It is preferred that one of the dyes added to the cathodic or the anodic layers be attached to a polymeric chain so as to reduce its transportation across the electrolyte layer. It is also preferred that these dyes be a part of a polymeric network that is crosslinked. As an example, PCT application WO2008/037643 describes a viologen attached to a polymeric material. The attachment may be carried out in several ways, where such dyes are attached to a polymeric chain and then incorporated into the layers (depending on how such layers are produced), or these get attached to the polymer during the extrusion operation, or are attached after the composite layer is fabricated by further subjecting this to heat and/or radiation, or the dyes bond to the materials within the respective layers after the EC devices are fabricated and then subjected to heat and/or radiation. As explained above the dyes may also be attached to the nano-particles where the dye or the nano-particle may be further attached covalently to the polymer in the layer. The dyes may be chemically attached following a variety of chemistries. For example in U.S. Pat. No. 6,420,036 ferrocene with hydroxyl groups is attached in a polyurethane system using isocyanate and polyol monomers with appropriate catalysts. Similarly vinyl ferrocenes may be attached to acrylic and methacrylic matrices using thermal or UV initiated systems. Similarly any anodic or a cathodic dye may be modified by attaching a chemical ligand which may be attachable to the layer. For example, U.S. Pat. No. 4,841,058 describes a viologen dye which is modified to attach an acrylate group so that it can be polymerized into a polymer with similar reactive groups. Each of the patents noted in this paragraph is included herein by reference. Using the same functional groups the dyes may be attached to the nanoparticles.

The lamination process of the pre-formed EC layer to the conductive substrates may be carried out using heat and pressure and is described well in U.S. Pat. Nos. 6,995,891 and 6,639,708. These patents also describe the laminate processing, desired strength of the electrolyte layer and adhesion to the substrates in order to acquire characteristics of safety glazing; all such concepts in these patents are incorporated herein by reference. In our invention, the strength of the composite layer and its adhesion characteristics to the substrates has to be similar if it is desired to achieve safety glass characteristics, i.e. adhesion of the electrolyte to give a peel force in excess of 1.8 kg/linear cm width (as measured by 90 degree peel force by American Society of Testing Materials (ASTM) test procedure D3167 or in excess of the electrolyte tensile strength, The thickness of the composite layer should preferably be in the range of 0.2 to 2 mm, and more preferably in the range of 0.4 to 0.9 mm. Exemplary thickness of the electrolyte layer in the multi-layer composite (i.e., without substrates) is about 50% or more of the total thickness of the multilayer. The other layers may be equal or unequal in thickness depending on the coloring efficiency and the redox characteristics. The preferred thickness of the anodic and the cathodic layers is about 50 microns or less. The boundary between the various layers of a multilayer EC film may be distinct or diffused.

The concentration of the dye in the anodic and the cathodic layers in the multilayer film is high, typically higher than 0.05M and preferably higher than 0.1M as all the electrochromic change occurs close to the electrodes, particularly when these materials are not too mobile and are tethered to these layers. The total polymer content in these layers is preferably below 60%. Majority of the balance are plasticizers, salts and/or ionic liquids. To ensure good adhesion between the layers, it is also preferred to have a similar polymer in all of the layer compositions. The anodic and cathodic layers may have additional adhesion promotion or tackifying agents to bond to the substrates. These layers may have lower viscosity or less crosslinking to ensure high tack to the substrates. The concentration of the UV stabilizers, plasticizers, may also be higher for the anodic and the cathodic layers in the multilayer laminatable film.

FIG. 1 shows an EC laminate for use in windows prepared by this method 11 shows two substrates 1 and 2 (glass or plastic) coated with transparent conductors 3 and 4 respectively. The composite layer (or multilayer structure) comprising of anodic layer 6, electrolyte 5 and cathodic layer 7 is also shown. These are brought together under heat and pressure and at the end of step 1 a laminate 12 is formed. At the end of step 2, sealant 8 is applied at the perimeter and the electrical connections shown by "+" and "_" so as to complete the EC cell 13. The sealant may be applied after the laminate 12 is prepared, or it may be applied on one of the substrates prior to forming the laminate in step 1, and then laminated along with the composite layer. The process of making such laminates, applying sealants and sealant materials are described in U.S. Pat. Nos. 6,995,891; 6,639,708, each of which is incorporated herein by reference. Sealants used are typically epoxies, polyurethanes, polysulfides, polybutyelenes, silicones, fluoropolymers or combination of these in a single material, or as multiple seals with different materials. Many specific sealant compositions are described in U.S. Pat. Nos. 5,724,187; 6,157,480 and US patent application 2006/0027260 (each of which is incorporated herein by reference) and all of these can be used. It may not be necessary to add spacers in these, if the thickness of the laminate will be determined by the polymeric electrochromic film. There may be additional layers inserted between the transparent conducting layer and the substrate. Some examples are diffusion barriers to prevent sodium/potassium or other ions from glass to diffuse into the EC layers or the electrolyte; conductive metal layer, lines and patterns to enhance surface conductivity; UV barriers, adhesion promoters, etc. The substrate itself may have UV blocking characteristics such as by adding titania and ceria to the compositions. Typically in a lamination the substrates and all the layers sandwiched between these are put in a bag with an opening and put in an autoclave. The temperature of the autoclave is raised between 80° to 200° C. and during this process the autoclave is evacuated. This removes any air bubbles trapped in the laminate materials. The pressure is then raised to between 50 to 300 psi to ensure that there is sufficient inter-diffusion of polymer molecules at the interface to get good adhesion to each other and to the substrates. One may also form the laminates without an autoclave where the laminate in a bag is placed in a press. Vacuum is pulled on the bag to evacuate air or any other non-desirable volatiles and then under heat, typically 80° to 200° C., pressure is applied by the platens in 25 to 300 psi range. During this process the polymeric layer between the substrate may further polymerize and/or crosslink.

Figure 2:
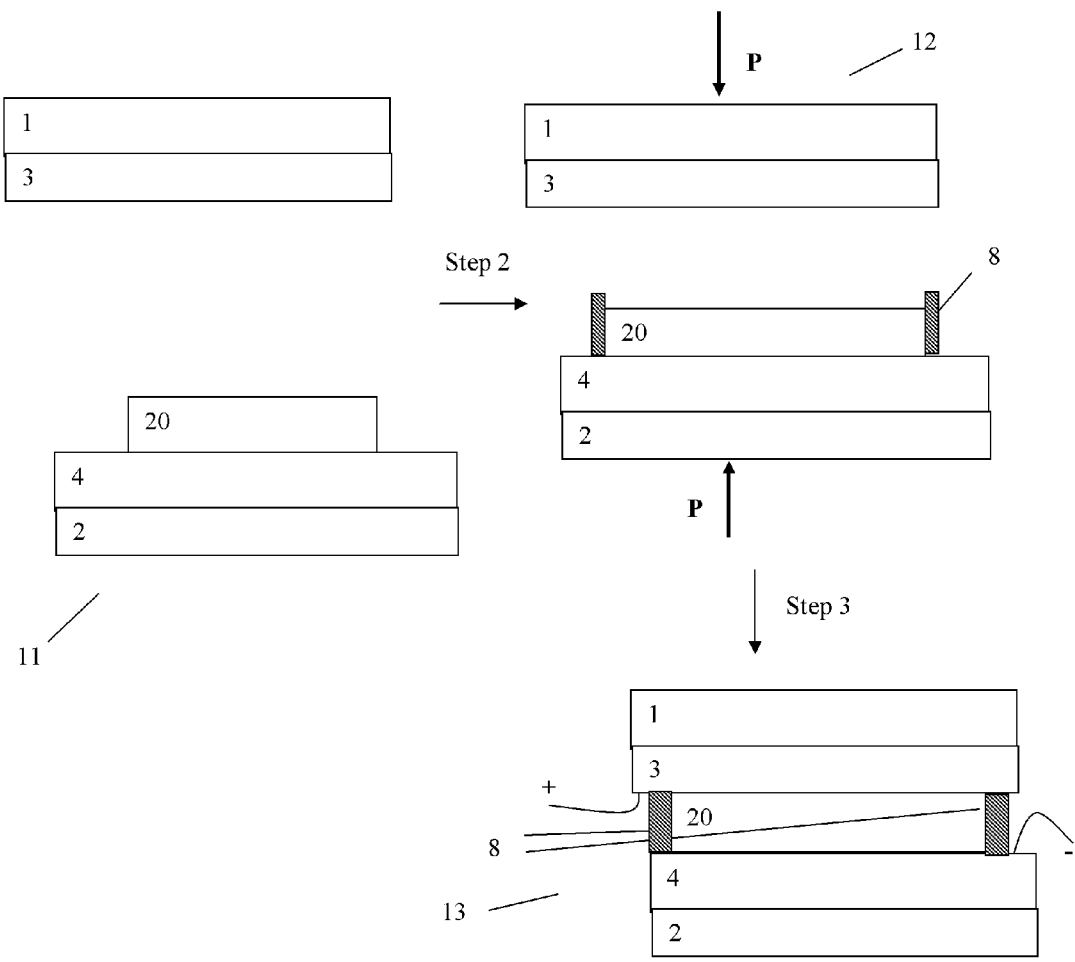
FIG. 2: Shows fabrication process of an EC device and seal processing by the inventive method.

FIG. 2 shows a window laminate being formed with a single polymeric layer EC film 20. Substrates 1 and 2 are coated with transparent conductors 3 and 4 respectively. Layer 20 is placed on the substrate so as not to catch any air bubbles. This process could be done in vacuum, or slight vacuum could be pulled after this is laid on the substrate. A sealant bead 8 is dispensed at its perimeter in step 2. This sealant could be an epoxy, urethane, butyl, polysulfide, silicone or any other material as described earlier. When the laminate is being formed, a vacuum may be applied first while the second substrate is being lowered to remove any entrapped air, and then a pressure "P" is applied while this may be heated to cure the sealant and consolidate the structure. In step three, busbar and connections are applied. Although this shows an offset, but other types of busbar may be used as discussed earlier.

The EC laminate may be planar or curved depending on the substrates used. Curved assemblies may also be made as taught in U.S. Pat. No. 6,039,390 by incorporating planar EC elements between curved but passive elements. EC Laminate assemblies may also be made in distinct addressable areas for windows and displays as taught in U.S. Pat. No. 6,373,618. The busbars to allow these panels to color uniformly and quickly, especially for large areas is discussed in U.S. Pat. Nos. 6,317,248 and 6,449,082 which are also applicable for use in laminates of this invention. The busbars include internal busbars which are grids or lines of highly conducting materials such as metal wires, meshes and patterns. If these internal busbars are electrochemically reactive, these are passivated on the surface by transparent conductors or other means so that they help in increasing the surface conductivity but do not participate in the electrochemical reactions. Gold lines or busbars may be put on surfaces as it is generally non-reactive in electrochromic devices. Use of these laminates in end-products, such as construction of window assemblies, powering and control of these windows, color choices, etc., are taught in several U.S. Pat. Nos. 6,493,128; 6,528,782 and 6,795,226 which may be applied to the EC laminates of this invention. All of the patents listed above in this paragraph are included herein by reference. As described in these inventions the glass substrates may be chemically or heat strengthened (or tempered). The transparent conductor may be deposited before or after the heat strengthening as long as the transparent conductors do not loose their conductivity, e.g., see U.S. Pat. No. 7,138,181. One may use these laminates in any window construction as discussed in U.S. Pat. Nos. 7,154,657 and 6,369,935.

One may also use polymeric substrates which have conductive coatings. The polymeric substrates may be flexible, preferred thickness for flexible substrates is less than 1 mm, and more preferably lower than 0.3 mm. Some of the substrate examples are polyester (e.g., polyethyleneterephthalate, poly thylenenaphthalate, e.g., Teonex® from Dupont (Wilmington, Del.)), acrylics, polycarbonate. These substrates may also have barrier coatings to stop both oxygen and water migration. These may be inorganic glasses and ceramics such as silica, alumina and titania comprising coatings. Typically the thickness of the inorganic barrier coatings is less than 200 nm. Parylene polymer coatings also result in high barrier properties. Since these are polymeric materials, the coating thickness is several microns. There are several types of Parylene, types C, D and N, and several vendors supply coating services, one such vendor is Para Tech Coating Inc (Aliso Viejo, Calif.). One may also use several layers of inorganic materials and inorganic polymers. One such system is available as Barix™ from Vitex Inc (San Jose, Calif.) which comprises of alternating layers comprising of polymers and inorganic materials (also see US patent application 20070049155). The conductive coatings on the substrates may be transparent conductors such as indium tin oxide (ITO), aluminum doped zinc oxide, fluorine or antimony doped tin oxide and gold. They may also be of the type dielectric/metal/dielectric, where the preferred metals are silver, gold, rhodium, chromium and ruthenium and their alloys, whereas at least one of the dielectric layer is preferably one of the transparent conductive materials listed above. One may also use conductive coatings formed by nano-particles in polymeric species. The nanoparticles are typically rod or wire shaped and may be made of conductive carbon and metals (e.g., silver). Such nano-particle conductive coatings are available from Cambrios Technology Corporation (Mountain View, Calif.). It is important that the conductive layer be in contact with the polymeric layer containing the electrochromic dye or material. One may also take the pre-formed EC film and then deposit conductive nano-particles from solutions (as used by Cambrios, e.g., see published US patent application 20070074316) and then laminate this with conductive or non-conductive substrates to form the final EC device. Flexible EC devices formed using the above substrates after laminating with polymeric EC films may be further laminated between two pieces of glass using standard lamination materials (e.g., Saflex® PVB films from Solutia (St. Louis, Mo.) or Butacite® (Dupont, Wilmington, Del.) between the EC device and each of the glass substrates to provide better protection and impart safety glass characteristics, however in this construction the two conductive sides in the EC device must be accessible for powering the device. It is best to use substrates that are close in refractive index (within 0.05) to the laminating materials described above. Further, in this case the sealant may be applied at the perimeter of the EC device or/and at the perimeter of the glass encapsulation plates. Windows may be made using such EC devices that comprise these conductive films and polymeric electrochromic films, and then further laminated within thicker plastic substrates that may be planar or shaped to give the desired impact resistance and light weight particularly for use in transportation.

A variety of flexible substrates may be used with transparent conductors (e.g., ITO, gold or dielectric/metal/dielectric, or with nano-particles as described elsewhere in this patent). The plastic substrates for any application may be heat stabilized in order to avoid shrinkage or shape changes in the lamination procedure. For example AuARE coatings from CP Films (Canoga Park, Calif.) range from 10-26 ohms/square, with visible transmission of 70% or greater. Such coatings on plastic substrates may be used to make the transportation windows. One may make laminates which have several EC devices stacked in order to get high optical attenuation. In this case a laminating medium (e.g., Safelex® or Butacite®) should be preferably inserted between each EC device. In this invention it is preferred to use substrates for windows which are coated with transparent conductive coatings, wherein the resistivity of such coatings is less than 30 ohms/square and the transmission of the coated substrates is about 70% or greater. Further, since the expansion coefficient of most plastics is larger than most metals and ceramics, and the ceramics have small elongations to break, it is preferred that the total stack of the ceramic transparent conductors (e.g., ITO) when deposited on polymeric substrates be thin, and preferably less than 1,000 nm, and more preferably less than 500 nm. This will keep the stresses in the coatings low and avoid cracking or crazing. The Polymeric substrates may be themselves multilayered or may also have coatings either underneath the transparent conductors or on the opposite surface that provide superior barrier properties, particularly to oxygen and water vapor transport. These may be other polymers (single or multilayers) such as those comprising polyvinylidene chloride, polyacrylonitrile and polyvinylalcohol, or coatings of inorganic materials such as silicon oxide and titanium oxide. The coatings on the substrates may also be configured to result in anti-glare properties, or to impart hydrophobic or hydrophilic properties. The polymeric substrates or the laminatable films may comprise UV absorbers, particularly those are preferred that provide protection in longer UV wavelengths (red shifted), e.g., CGL139 from Ciba Specialty Chemicals (White Plains, N.Y.). Such materials are described in U.S. Pat. No. 6,187,845, which is incorporated herein by reference.

To further increase durability to solar radiation, it may not be enough to only provide the UV blocking mechanisms and materials as is known in the electrochromic literature, but to also lower the transmission in the visible range particularly in the blue and the violets, i.e., preferably blocking between 400 and 420 nm, and more preferably between 400 and 450 nm, and most preferably between 400 and 500 nm before the solar radiation passes through the EC film. Some of the polymers that absorb in lower wavelength visible spectrum are polyimides and polyethersulfones which may be used as one of the substrates. The windows will acquire a permanent color in the bleached state, such as yellow, brown and bronze. Further, when the EC windows are darkened, say to a blue color, i.e. preferably to absorb the longer wavelengths (which is common for most EC materials), the darkening will impart a more neutral color to the window. The conductive coatings may also be optionally used as a resistance electrical heater, for defrosting or provide comfort in the interior.

Figure 6A:
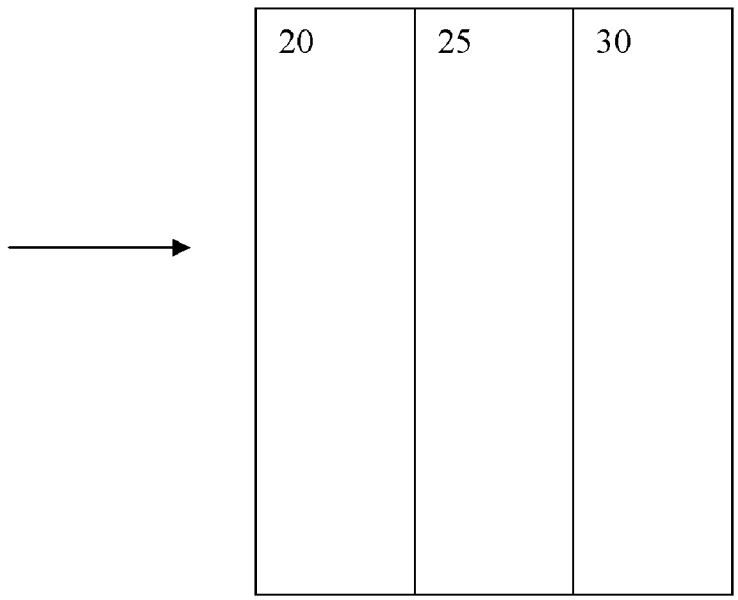
FIGS. 6a and b: Shows an EC window that attenuates the solar radiation in selective parts of the spectrum before impinging on the electrochromic component.
Figure 6B:
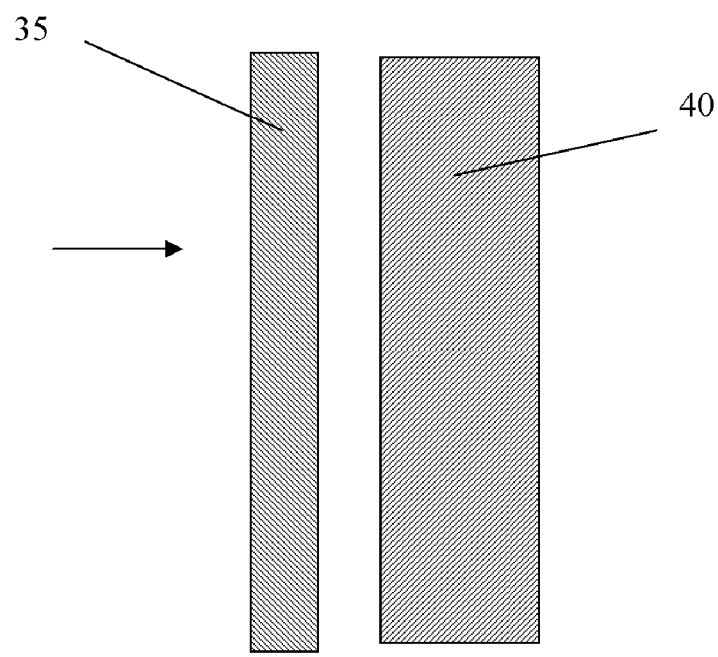

If only one substrate is blocking the visible light, then it should preferably face the Sun (or outside) for the window application. See FIG. 6a, where the solar radiation direction is shown by an arrow and the EC window is made out of two substrates 20 and 30 with EC materials between them; the solar radiation as explained below can be blocked by substrate 20. The preferred substrates for windows that are exposed to solar radiation during their intended application, are those which block out substantial radiation (average blockage more than 99%) in the UV i.e., between 290 and 400 nm. The solar radiation on earth is typically above 290 nm, but at higher altitudes (such as for airplane windows) solar radiation at lower wavelengths is experienced by the windows with increasing elevation. For these windows one may consider an increased range of blocking particularly, down to 270 nm or lower. It is further preferred that they also block in the visible range, particularly blocking the violets and the blue wavelengths. It is preferred that the substrates blocking radiations of these colors reduce the solar transmission between 400 to 420 nm and most preferably between 400 and 475 nm. Some of the optical characteristics of the preferred light blocking characteristics are shown in Filtron® products E420 and E465 made by Gentex Corporation (Simpson, Pa.), which may be used to block solar radiation selectively before it impinges on the electrochromic component. A preferred average transmission in these ranges is less than 20% and more preferably less than 5%. Since photopic sensitivity is high at 550 nm, it is preferred that for good visibility, these windows have a high transmission at 550 nm, i.e. greater than about 50%. The transmission in the rest of the visible region should also be greater than 50% for improved visibility. The low transmission can come from the substrate or any coatings deposited on it including the transparent conductor. A very high durability EC window to solar radiation is obtained by blocking the UV and the high energy visible radiation. Another example of a blocking window is provided in FIG. 6b, where the solar radiation direction is shown by an arrow, and the EC element 40 is protected by a blocking filter 35. The blocking characteristics in FIG. 6a or 6b may be provided by coatings deposited on the blocking elements or that may be the intrinsic properties of the substrate. For the purposes of solar radiation protection, the scope of EC windows also include other variable transmission windows such as those made by field activated devices such as liquid crystals, polymer dispersed liquid crystals and suspended particles.

Example 1

Preparation of an Electrochromic Device with ITO Coated Glass Substrates and Three Laminatable Polymeric Films An electrochromic cell was prepared by laminating three free standing flexible polymeric films between two pieces of ITO coated glass. The conductivity of the ITO was 12 Ω/sq. The first polymeric layer contained the cathodic dye 1,1'dimethyl-4-4'-dipyridium bis(bis(trifluoromethylsulfonyl)imide also known as ethyl viologen 2NTf This dye was prepared by reacting 1,1'dimethyl-4-4'dipyridinium diodide with lithium bis(trifluoromethylsulfonyl)imide in water and isolating the solid product by filtration. The second electrolyte layer acted as an ion conductor and did not contain cathodic or anodic species. The third layer contained the anodic species 5,10-Dihydro-5-10-dimethyl phenazine. The composition to make each polymeric film is given below:

---
Polymeric film 1 (cathodic layer)

4.25 g poly(vinyl formal)
5.175 g propylene carbonate (PC)

---
-continued 0.575 g 1-butyl-3-methyl-pyrrolidium bis(trifluoromethyl sulfonyl) imide (IL
0.1548 g ethyl viologen 2NTF (0.02 M)
6.8 mls Tetrahydrofuran (THF)
0.1 g 100 μm glass spacer beads
Polymeric Layer 2 (electrolyte layer)

4.25 g poly(vinyl formal)
5.175 g propylene carbonate (PC
0.575 g 1-butyl-3-methyl-pyrrolidium bis(trifluoromethyl sulfonyl) imide (IL
6.8 mls Tetrahydrofuran (THF)
0.1 g 300 μm glass spacer beads
Polymeric Layer 3 (anodic layer)

4.25 g poly(vinyl formal)
5.175 g propylene carbonate (PC
0.575 g 1-butyl-3-methyl-pyrrolidium bis(trifluoromethyl sulfonyl) imide (IL
0.042 g 5,10-Dihydro-5-10-dimethyl phenazine (0.02 M)
6.8 mls Tetrahydrofuran (THF)
0.1 g 100 μm glass spacer beads

---

The three formulations above were each prepared in a 100 ml sure seal bottle with a stir bar under a nitrogen atmosphere. Tetrahydrofuran (THE) was used as an easily removal co-solvent to enhance mixing by reducing viscosity. The formulations were heated to 65° C. and stirred until dissolved which took about 3 to 4 hours. All solutions were concentrated by removing THE at 75° C. under reduced pressure and then degassed at 95° C., which resulted in a high viscosity material that could be cast into a film at elevated temperatures. This process took approximately two hours. After degassing the solution was cooled to room temperature and stored under nitrogen prior to using to forming the different layers in the electrochromic cell.

Electrochromic Cell Preparation

An electrochromic cell was prepared using the above layers. The layer placement is schematically shown in FIG. 1. Layers 1, 2, 3 are shown as Layers 7, 5 and 6 respectively in this figure.

The cell structure above was prepared using the following procedure. Layer #1 material was heated to 95° C. and at the same time, two 4"×4" aluminum heater blocks were heated to 88° C. A square piece of polyester sheeting was taped onto the bottom aluminum block using polyimide tape. A piece of ITO coated glass was then taped on top of the polyester sheeting. With the ITO coating facing up the hot electrolyte was poured onto the ITO coated glass in the shape of a dog bone. Then a piece of polyester sheeting was placed on top of the electrolyte starting at the center line of the dog bone. A stainless steel draw down rod was used to gently roll the bubbles in the electrolyte from the center to the outside edges. A second top aluminum heating block was placed on top of the polyester sheeting and the complete assembly was left at 88° C. for about 5 minutes. The heating blocks were turned off and the assembly cooled to 60° C. The top block was removed and the coated electrode cooled to room temperature and removed from the bottom block. This composite of glass/ITO/layer #1 was kept covered with the polyester sheeting and was placed in a sealed plastic bag. This same procedure was used to coat a glass/ITO substrate with layer #3.

The layer #2 to be used for combining the two coated substrates was prepared the same way with the exception that it was deposited on the hot block on a polyester film, and once the film was formed and THF removed, it was covered by another polyester film. The two pieces of polyester sheeting acted as release layers. To form the electrochromic device electrolyte #2 film was removed from the polyester sheeting and was carefully placed on top of the glass/ITO/electrolyte #1 stack and on top of this was placed the glass/ITO/electrolyte #3 stack. This gave the following cell configuration:
Glass/ITO/Layer #1 (100 μm)/Layer #2 (300 μm)/Layer #3 (100 μm)/ITO/Glass Since the polymeric composition of all the three layers is similar, an alternative method is to form all the three films independently with release layers (as the one made for Layer 2) and then place them on the substrate one after the other in the sequence and laminate them all together along with the two substrates. It is desirable to lower the films on each other in vacuum so as not to trap air bubbles, or to draw vacuum on the films prior to lamination under pressure in order to remove entrapped air or gas bubbles.

Yet another high speed method is to co-extrude all the three layers and combine these webs together before these cool down, and then use this film with three layers to laminate the two conductive substrates. The combined film may be stored as rolls, which are cut to size at the lamination plant.

The edges of this device were then sealed with polyimide tape and small binder clips were used to hold the cell together. To color the cell the negative lead was placed on ITO/electrolyte #1 electrode and the positive lead was placed on ITO/electrolyte #3 electrode. The cell was colored at 1.3 volts and shorted to bleach. The data on color kinetics at 550 nm is listed in Table 1.

TABLE 1

Kinetic data at 550 nm

| Color 1.3 volts (10 minutes) | | Bleach (Shorted mode) 10 minutes | |
|---|---|---|---|
| | % T (550 nm) | | % T (550 nm) |
| Initial | 65 | Initial | 40 |
| Final | 40 | Final | 59 |
| ΔT | 25 | ΔT | 19 |

Example 2

Preparation of an Electrochromic Device with Three Polymeric Laminatable Films Using a Bridged Electrochromic Dye An electrochromic cell was prepared as described in example 1 except that a bridged electrochromic dye 4-4'bipyridinium1,(4(Ferroceneyl butyl),1 methyl 1,1,1-trifluoro-N-[(trifluoromethyl)sulfonyl]methanesulfonamide (Fc-Vio Im), was used as the redox species in the cathodic and in the anodic layer the redox species was 5,10-dihydro-5-10-dimethyl phenazine. The formulation for the three different layers is shown below and the cells were prepared as previously described in example 1.

Layer 1 (cathodic)

4.25 g poly(vinyl formal)
5.175 g propylene carbonate (PC
0.575 g 1-butyl-3-methyl-pyrrolidium bis(trifluoromethyl sulfonyl) imide (IL
0.2235 g Fc-Vio-Im Dye (Bridged Dye) (0.02M)
6.8 mls Tetrahydrofuran (THF)
0.1 g 100 μm glass spacer beads Layer 2 (electrolyte)

4.25 g poly(vinyl formal)
5.175 g propylene carbonate (PC
0.575 g 1-butyl-3-methyl-pyrrolidium bis(trifluoromethyl sulfonyl) imide (IL
6.8 mls Tetrahydrofuran (THF)
0.1 g 300 μm glass spacer beads Layer 3 (anodic)

4.25 g poly(vinyl formal)
5.175 g propylene carbonate (PC
0.575 g 1-butyl-3-methyl-pyrrolidium bis(trifluoromethyl sulfonyl) imide (IL
0.042 g 5,10-Dihydro-5-10-dimethyl phenazine (0.02M)
6.8 mls Tetrahydrofuran (THF)
0.1 g 100 μm glass spacer beads Two cells were prepared and powered at 1.3 and 1.4 volts respectively as shown in Table 2. For cell #1 the initial transmission at 550 nm was 69% T and at a color potential of 1.3 volts it decreased to 20% T in ten minutes. At a power bleach of −1.3 volts the cell went from 17% T to 57% T in ten minutes. The second cell (cell #2) was colored at 1.4 volts and went from 78% T to 31% T in ten minutes. The color potential was applied for another ten minutes and the % T dropped to 24%. This cell was then tested for open circuit stability in the colored state. Under open circuit conditions after 20 minutes the transmission changed from 24 to 40% T. The cell was then shorted and went to 60% T in 20 minutes.

TABLE 2

Kinetic data for EC Cell

| Initial % T (550 nm) | Voltage (v) | Final % T (550 nm) | Time to final % T (mins) |
|---|---|---|---|
| Cell #1 - 1st Color and 1st Bleach | | | |
| 69 | 1.3 | 20 | 10 |
| 17 | −1.3 | 57 | 10 |
| Cell #2 - 1st Color and 1st Bleach | | | |
| 78 | 1.4 | 31 | 10 |
| 31 | 1.4 | 24 | 10 |
| 24 | Open circuit | 31 | 10 |
| 31 | Open circuit | 40 | 10 |
| 40 | Shorted | 53 | 10 |
| 53 | Shorted | 60 | 10 |

Example 3

Preparation of an Electrochromic Device with Three Polymeric Laminatable Films Using a Bridged Electrochromic Compound as Cathodic Dye An electrochromic cell was prepared as in example 2 above except that the concentration of the cathodic (bridged dye) and anodic (5,10-dihydro-5-10-dimethyl phenazine) species were increased from 0.02M to 0.04M respectively. Also the thickness of the layers containing the Redox species was reduced from 100 μm to 53 μm. The electrolyte layer thickness was 300 μm. The electrochromic cell configuration was as follows:
Glass/ITO/Layer #1 (53 μm)/Layer #2 (300 μm)/Layer #3 (53 μm)/ITO/Glass The cell was colored at 1.3 volts and went from 70% T to 8% T in 10 minutes as seen in Table 3. The ΔT for the cell was 62%. The cell was bleached in two ways the first under short circuit and the second power bleached at −1.0 and −1.3 volts as seen in Table 3 and FIG. 3.

TABLE 3

Kinetic data for EC Device

| Initial % T (550 nm) | Voltage (v) | Final % T (550 nm) | Time to final % T (mins) |
|---|---|---|---|
| 70 | 1.3 | 8 | 10 |
| 7 | Shorted | 13 | 6 |
| 13 | −1.0 | 25 | 5 |
| 25 | −1.3 | 62 | 30 |

Example 4

Preparation of an Electrochromic Device with Three Polymeric Laminatable Films Using a Bridged Electrochromic Compound as Cathodic Dye An electrochromic cell was prepared as in example 3 except that the concentration of the cathodic (bridged dye) and anodic (5,10-dihydro-5-10-dimethyl phenazine) species were increased from 0.04M to 0.08M respectively. Increasing the dye concentration greatly decreased the time to color at 1.3 volts as seen in Table 4. The cell colored from 77% T to 14% T in 28 seconds. The bleach speed also increased and in shorted mode the cell went from 14% T to 72% T in 71 seconds.

TABLE 4

Kinetic Data for EC device

| Initial % T | Voltage (v) | Final % T | Time to final % T (seconds) |
|---|---|---|---|
| 76.5 | 1.3 | 14.2 | 28 |
| 14.2 | Shorted | 65.0 | 67 |
| 65 | Shorted | 71.6 | 43 |
| Repeat Color | | | |
| 71.6 | 1.3 | 14.0 | 28 |

Example 5

Preparation of Electrochromic Device Using a Polymeric EC Cathodic Material

An electrochromic device was prepared as described in example 4 above except that the redox couple was a polymer film of 5,10-Dihydro-5,10-Dimethylphenazine and the other redox component was a spin coated film of poly(3,4-ethylenedioxythiophene) PEDOT doped with polystyrenesulfonate (cationic layer). The different layers comprising the EC device are shown below.

Layer 1 (anodic)

4.25 g poly(vinyl formal)
5.175 g propylene carbonate (PC
0.575 g 1-butyl-3-methyl-pyrrolidium bis(trifluoromethyl sulfonyl) imide (IL
0.042 g 5,10-Dihydro-5-10-dimethyl phenazine (0.02M)
6.8 mls Tetrahydrofuran (THF)
0.1 g 100 μm glass spacer beads -continued Layer 2 Electrolyte 4.25 g poly(vinyl formal)
5.175 g propylene carbonate (PC
0.575 g 1-butyl-3-methyl-pyrrolidium bis(trifluoromethyl sulfonyl) imide (IL
6.8 mls Tetrahydrofuran (THF)
0.1 g 300 μm glass spacer beads
Layer 3 Polymeric EC (cathodic)

Baytron P JET HC (solution of poly(3,4-ethylenedioxythiophene, PEDOT doped with polystyrenesulfonate) (cationic) thin film 150 nm Layers 1 and 2 were prepared as previously described in example 1. The PEDOT layer was deposited from a solution obtained from H. C. Starck (Newton, Mass.) with the trade name Baytron P JET HC. This was spin coated directly onto Layer 2 which was pre-deposited on a glass substrate. The spin speed was 400 RPM to give an equivalent thickness of 120 nm. However, the solution diffused into the top part of the underlying Layer 2. The substrate with the composite coating of PEDOT and Layer 2 was placed in an oven at 55° C. to dry for 5 minutes. This composite coating was then peeled from the glass side and placed onto a clean piece of ITO/glass with the PEDOT side touching the ITO. It was pressed down to achieve good adhesion. Layer 1 was formed on top of a second substrate coated with ITO. The two substrates were assembled together as a laminate with Layer 1 touching the Layer 2. The cell configuration was as follows:
Glass/ITO/Layer #1 (53 μm)/Layer #2 (300 μm)/Layer #3 (150 nm)/ITO/Glass The edges of this device were sealed with Kapton® tape and small binder clips were used to hold the cell together. To color the cell the positive lead was placed on electrode containing electrolyte #1 and the negative lead was placed on electrode containing electrolyte #3. The results are shown in the Table 5 below.

TABLE 5

Kinetic Data

| Initial % T (550 nm) | Voltage (v) | Final % T (550 nm) | Time to final % T (mins) |
|---|---|---|---|
| 62 | 1.4 | 39 | 30 |
| 39 | Shorted | 43 | 2 |

The same device could have been prepared by an alternative process, where layer 1 and 2 are prepared and combined together as a single composite layer, and then the solution comprising PEDOT is contacted with the layer 2 side of the this composite layer so as to soak the solution to a desired depth into this composite. The composite film could be then used to prepare the final device by laminating between two conductive substrates with the conductive sides touching this composite layer. One may spray the solution of PEDOT on the layer 2 side of the above laminate instead of a soak, or even combine PEDOT within a polymeric material so that it may be formed as film by co-extrusion and combined with the other films before lamination.

Example 6

Preparation of Flexible Electrochromic Device

A flexible EC device was prepared using thin sheets (~8 Mil) of polyester (PE) coated with ITO (50 Ω/sq), supplied by CPFilms Canoga Park, Calif., as substrate/electrodes. Between the electrodes the three flexible films were placed containing Redox species (anodic and cathodic species respectively) and electrolyte medium. The three layers were of the following composition and were prepared as described in Example 1.

---

Layer 1 (cathodic)

4.25 g poly(vinyl formal)
5.175 g propylene carbonate (PC)
0.575 g 1-butyl-3-methyl-pyrrolidium bis(trifluoromethyl sulfonyl) imide (IL
0.2235 g Ferrocene Viologen Imide Dye (Bridged Dye) (0.08M)
6.8 mls Tetrahydrofuran (THF)
0.1 g 53 μm glass spacer beads Layer 2 (Electrolyte)

4.25 g poly(vinyl formal)
5.175 g propylene carbonate (PC
0.575 g 1-butyl-3-methyl-pyrrolidium bis(trifluoromethyl sulfonyl) imide (IL
6.8 mls Tetrahydrofuran (THF)
0.1 g 300 μm glass spacer beads Layer 3 (anodic)

4.25 g poly(vinyl formal)
5.175 g propylene carbonate (PC
0.575 g 1-butyl-3-methyl-pyrrolidium bis(trifluoromethyl sulfonyl) imide (IL
0.042 g 5,10-Dihydro-5-10-dimethyl phenazine (0.08M)
6.8 mls Tetrahydrofuran (THF)
0.1 g 53 μm glass spacer beads

---

An EC cell with the structure below was prepared by heating formulation for layer #1 to 95° C.

PE/ITO/Layer #1 (53 μm)/Layer #2 (300 μm)/Layer #3 (53 μm)/ITO/PE

Two 4"×4" aluminum blocks were heated to 88° C. A square piece of conductive polyester sheeting (coated with ITO) was taped onto the bottom aluminum block using kapton tape. The ITO coating was facing up. The hot electrolyte was then poured onto the ITO coated polyester in the shape of a dog bone. A piece of polyester sheeting was then placed on top of the electrolyte starting at the center line of the dog bone. A stainless steel draw down rod was used to gently roll the bubbles in the electrolyte from the center to the outside edges. The top aluminum heating block was then placed on top of the polyester sheeting and it was left at 88° C. for about 5 minutes. No extra pressure was applied. The heating blocks were then turned off and were cooled to 60° C. The top block was removed and the device cooled to room temperature and then removed from the bottom block. This polyester/ITO/electrolyte layer was kept covered with the polyester sheeting and was placed in a sealed plastic bag. The procedure was repeated to coat a piece of polyester/ITO with formulation for layer #3. Layer #3 was prepared between two pieces of polyester sheeting which acted as release layers and stored in a sealed plastic bag.

The EC device was assembled by sequentially placing first substrate (polyester-ITO)/layer #1, layer #2, layer #3 and second substrate (ITO-Polyester) respectively. This was laminated as described above at 95° C. The edges of this device were then sealed with kapton tape to hold the cell together. To color the cell the negative lead was placed on electrode containing electrolyte #1 and the positive lead was placed on electrode containing electrolyte #3. The EC cell characteristics are shown in Table 6.

TABLE 6

Flexible EC cell characteristics

| Properties | Value | | |
|---|---|---|---|
| Polyester/ITO thickness | ~8 Mil | | |
| Resistance ITO | 50 Ω/sq | | |
| Total Cell thickness | ~32 Mil | | |
| Maximum bending before delamination (radius of curvature) | 0.82" | | |
| % Transmission (550 nm) not colored (bleached) | 62% | | |
| % Transmission (550 nm) colored at 1.3 volts for 44 seconds | 14% | | |
| Time to color (1.3 volts) 80% of range | 22 seconds | | |
| Time to bleach (shorted) 80% of range | 94 seconds | | |
| | X | Y | Z |
| Color Coordinates (cell bleached) | 32.03 | 36.09 | 6.05 |
| Color Coordinates (cell colored) | 5.71 | 9.12 | 1.79 |

Example 7

Preparation of Electrochromic Devices Prepared by Laminating Single Multilayer EC Polymeric Film Layers 1 to 3 were prepared as previously described in example 6 except that for all compositions glass bead spacers in a size of 300 μm were added. These layers are formed individually between removable films (or rigid glass substrates). Layer 1 and 2 are combined by peeling one of the removable films and combining the two. The two layer composite was then combined with layer three by removing the peelable layers from them resulting in the following Glass/Layer 1+Layer 2+Layer 3/Glass Glass was used for convenience above, but one may have also used flexible film. The glass substrates were removed from both sides resulting in a free standing film comprising all the three layers. This composite film was then used to prepare one device using ITO coated glass as substrates and another using flexible polyester film coated with ITO as substrates. The electrochromic characteristics of the devices are listed in Table 7.

Cell #1: Glass/ITO/Layer 1+Layer 2+Layer 3/ITO/Glass

Cell #2: Polyester/ITO/Layer 1+Layer 2+Layer 3/ITO/Polyester

TABLE 7

EC characteristics of cells made from single free standing layer

| Initial % T | Voltage (v) | Final % T | Time to final % T (mins) |
|---|---|---|---|
| Cell #1 | | | |
| 62.2 | 1.3 | 6.2 | 1.5 |
| 6.2 | Shorted | 55.8 | 7 |
| 55.8 | 1.3 | 6.2 | 1.3 |
| 6.2 | Open circuit | 6.4 | 15 |
| 6.4 | Open circuit | 15.1 | 45 |
| 15.1 | Open circuit | 25.1 | 55 |
| Cell #2 | | | |
| 54.8 | 1.3 | 14.9 | 1.33 |
| 14.9 | Shorted | 52.0 | 3.33 |
| 52.0 | 0.9 | 23.9 | 1.33 |
| 23.9 | 0.9 | 9.7 | 1.75 |
| 9.7 | Shorted | 48.1 | 6.8 |

TABLE 7-continued

EC characteristics of cells made from single free standing layer

| Initial % T | Voltage (v) | Final % T | Time to final % T (mins) |
|---|---|---|---|
| 50.0 | 1.1 | 13.2 | 1.33 |
| 13.2 | Shorted | 48.6 | 7.3 |

Figure 3:
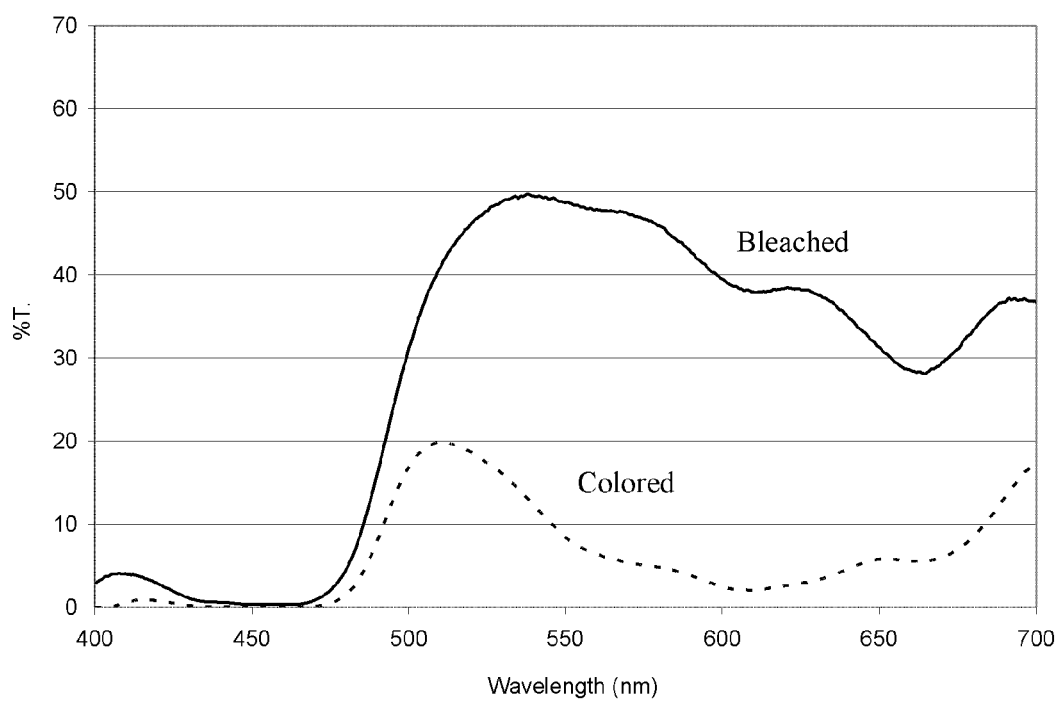
FIG. 3: Shows an EC device spectral characteristics in the colored and in the bleached states, fabricated by the inventive method.

A percent transmission spectrum between 400 and 700 nm of cell#1 using ITO coated glass as substrates is shown in FIG. 3, in both colored and bleached states.

Example 8

EC Devices with Polymer Film with Uniformly Dispersed Anodic and Cathodic EC Dyes. Film Cast on One of the Electrodes A polymer electrolyte formulation was made with the following composition, following the procedure in Example 1. Both the substrates for making this EC device were 7 mil heat stabilized polyester film coated with gold (AuARE 14) 14±2 Ω/sq surface resistivity and visible transmission of 74%.

| Polymer Layer (cathodic + anodic) |
|---|
| 8.5 g poly(vinyl formal) |
| 10.35 g propylene carbonate (PC) |
| 1.15 g 1-butyl-3-methyl-pyrrolidium NTF (IL |
| 0.894 Ferrocene Viologen Imide Dye (Bridged Dye) (0.08M) |
| 0.3360 g 5,10-Dihydro-5,10-dimethyl phenazine (0.08M) |
| 13.6 ml Tetrahydrofuran (THF) |
| 0.1 g 300 μm glass spacer beads |

The film was cast on one of the substrates as in Example 1 and then laminated using the other substrate. The edges were sealed in the same fashion. The cell construction was:

Polyester+Gold/Electrolyte (300μm)/Gold+Polyester.

The cell performance is shown in Table 8

TABLE 8

| Initial % T | Voltage (v) | Final % T | Time to final % T (seconds) |
|---|---|---|---|
| 52.0 | 1.3 | 12.8 | 51 |
| 12.8 | Shorted | 51.1 | 178 |

A free standing film was cast as in Example 1 (layer 2) using the same formulation as above. The visible transmission of the film was 75%. This was then laminated between AuARE14 substrates using the same method as in example 7. The performance is shown in Table 9.

TABLE 9

| Initial % T | Voltage (v) | Final % T | Time to final % T (seconds) |
|---|---|---|---|
| 50.8 | 1.3 | 12.1 | 77 |
| 12.1 | Shorted | 48.7 | 273 |

Figure 4:
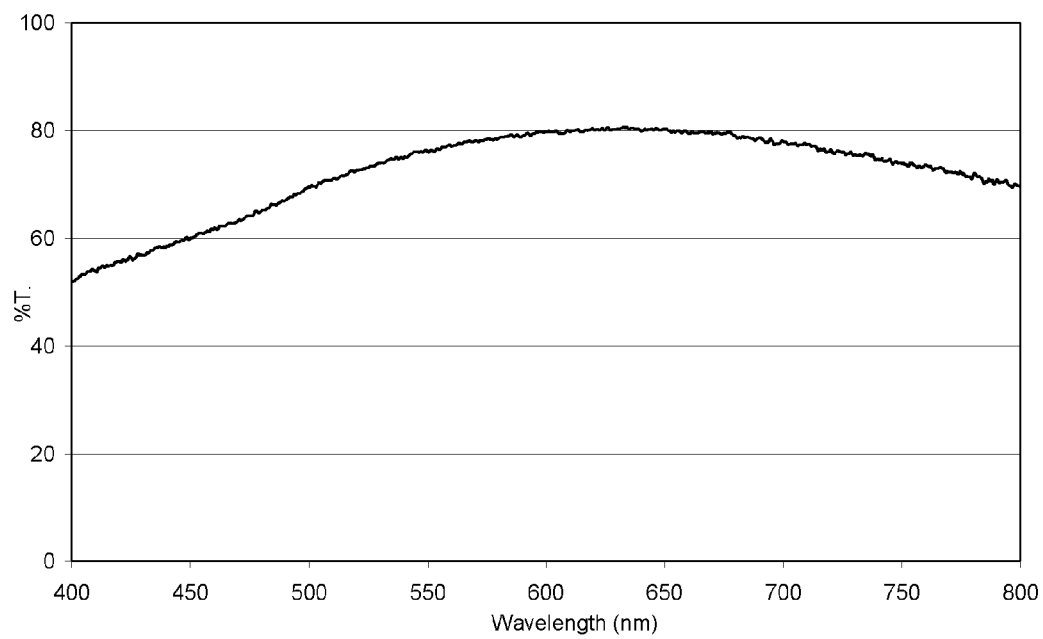
FIG. 4: Shows the spectrum of a flexible substrate with a conductive coating used for fabricating of EC devices.

For a window application one could also use AuARE14 substrate on one side, especially the side facing the Sun and the other substrate being ITO coated polymer. A spectrum of AuARE14 substrate is shown in FIG. 4.

Another cell was made where the electrolyte was first formulated with the following ingredients.

| Polymer Layer (cathodic + Anodic) |
|---|
| 8.5 g poly(vinyl formal) |
| 10.35 g propylene carbonate (PC) |
| 1.15 g 1-butyl-3-methyl-pyrrolidium NTF (IL) |
| 0.2277 g Ethyl Viologen 2NTF (0.08M) |
| 0.3360 g 5,10-Dihydro-5,10-dimethyl phenazine (0.08M) |
| 13.6 ml Tetrahydrofuran (THF) |
| 0.16 g 300 μm glass spacer beads |

The electrolyte above was prepared in a 100 ml sure seal bottle with a stir bar. This was done in the glovebox. The sure seal bottle was sealed and then removed from the glovebox. It was heated to 65° C. and was stirred until dissolved. This took about 3 to 4 hours. The solution was then degassed in the fume hood using a vacuum pump. The electrolyte was heated to 75° C. for degassing in order to remove the THF. Once the bubbling was nearly stopped, the temperature was increased to 95° C. and the solution was degassed again. Bubbling decreased after about 30 minutes. The degassing was then stopped and the solution was cooled to room temperature. The sure seal container was then filled with nitrogen gas.

The EC cell above was prepared using the following procedure. The electrolyte was heated to 95° C. At the same time, two 4"×4" aluminum blocks were heated to 88° C. using thermocouples and a temperature controller. A square piece of polyester sheeting was taped onto the bottom aluminum block using Kapton® tape. The hot electrolyte was then poured onto the polyester in the shape of a dog bone. Another piece of polyester sheeting was then placed on top of the electrolyte starting at the center line of the dog bone. A stainless steel draw down rod was used to gently roll the bubbles in the electrolyte from the center to the outside edges. The top aluminum heating block was then placed on top of the polyester sheeting and it was left at 88° C. for about 5 minutes. No extra pressure was applied. The heating blocks were turned off and were cooled to 60° C. The top block was removed. The film was cooled to room temperature and was removed from the bottom block. The freestanding electrolyte film was removed from between the polyester sheets and was then placed between two pieces of gold coated polyester to make a device.

Polyester (7mil)/Gold 14Ω/☐/Electrolyte(300μm)/ Gold 14Ω/☐/Polyester(7mil)

The edges of this device were taped with Kapton® tape to hold it together. The cell was colored and bleached. Glass spacers were only added to control the thickness of the film. If other casting or extrusion methods are used as are known in making films in the polymer industry, it is not necessary to use the spacers. The electrochromic data for this cell is shown below in Table 10.

TABLE 10

| Initial % T | Voltage (v) | Final % T | Time to final % T (seconds) |
|---|---|---|---|
| 53.9 | 1.3 | 20.8 | 75 |
| 20.8 | Shorted | 50.8 | 185 |
| 50.8 | 1.3 | 16.8 | 75 |
| 16.8 | Shorted | 50.6 | 335 |

The leakage current in the colored state for the device was 0.05 mA/cm$^2$ and the minimum transmission at 1.3V was 14.5%. When the device was shorted to bleach 80% of the range it took 28 s. It was colored again to 11.5% and when left in open circuit mode the same range of bleaching took 592 s.

Example 9

Figure 5:
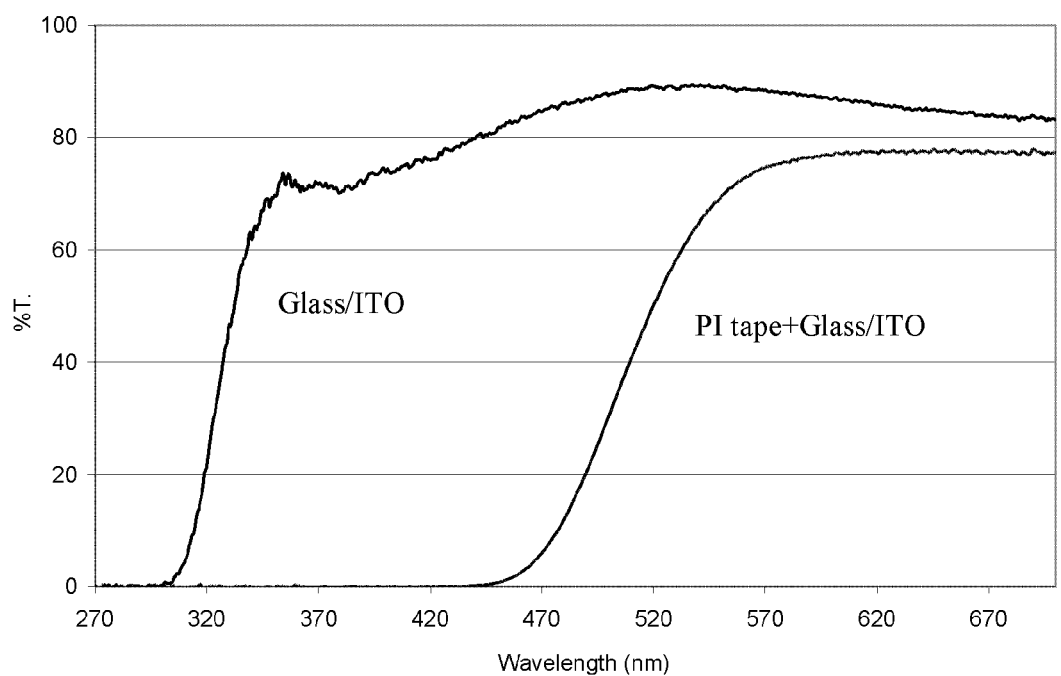
FIG. 5: Shows EC spectrum of substrates with conductive coating that may be used for fabrication of EC devices.

Transmission of a Glass Coated with ITO and One of Same Substrate Laminated with a Polyimide (Kapton®) Tape on the Glass Side A glass coated ITO substrate was measured for its transmission from 270 nm to 700 nm at wavelength intervals of 0.5 nm. A polyimide pressure sensitive tape (Polyimide (PI) thickness was 50 µm) was applied to the glass side to block the violet and the blue color transmission and substrate was re-evaluated. FIG. 5 shows the spectra of these substrates. Table 10 lists average transmissions at various wavelength ranges and at 550 nm. Usually the transmission at 550 nm can be closely approximated as visible or photopic transmission. The transmission reduction due to PI can be controlled by changing its thickness. To reduce its thickness one may also coat polyimide from a solution directly on to the substrate, with preferably using an adhesion promoter between itself and the substrate.

TABLE 10

| | nm | | | | | | | | |
|---|---|---|---|---|---|---|---|---|---|
| | 270-290 | 270-360 | 360-400 | 400-420 | 400-450 | 400-500 | 500-600 | 500-700 | At 550 |
| % T, Glass/ITO | 0 | 27 | 73 | 77 | 78 | 82 | 89 | 87 | 89 |
| % T, PI on glass/ITO | 0 | 0 | 0 | 0 | 0 | 6 | 64 | 71 | 69 |

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

The invention claimed is:

1. An electrochromic device formed by assembling a pair of substrates having conductive layers with a preformed multi layer film formed independently of the conductively coated substrate, wherein the device is assembled with the conductive layers of the substrates facing inwards and sandwiching the pre-formed multilayer solid film wherein the said preformed multi layer film comprises at least two layers with different compositions, and at least one of these layers having electrochromic properties and at least one layer having electrolytic properties.

2. An electrochromic device formed as in claim 1 where the multilayer polymer film comprises an anodic layer, a cathodic layer and an electrolyte layer.

3. An electrochromic device formed as in claim 1, where the pre-formed multilayer film is formed by co-extrusion.

4. An electrochromic device formed as in claim 1, where the multilayer film comprises thermoplastic and thermoset layers.

5. An electrochromic device formed as in claim 1 wherein, at least one of the layers in the multilayer film is further polymerized after assembling with the said substrates.

6. An electrochromic device formed as in claim 1 where the lamination process to assemble the substrate and the multi-layer film is carried out under heat and pressure.

7. An electrochromic device formed by assembling a pair of substrates having conductive coatings with a preformed multi layer film formed independently of the conductively coated substrate, wherein the device is assembled with the conductive coatings of the substrates facing inwards and sandwiching the pre-formed multilayer solid film wherein the said preformed multilayer film comprises at least three layers with different compositions, and at least one of these layers having anodic properties, another one of these layers having electrolytic properties and another one of these layers having cathodic properties.

8. An electrochromic device formed by assembling a pair of substrates having conductive coatings with at least two preformed film layers formed independently of the conductively coated substrate, wherein the device is assembled with the conductive coatings of the substrates facing inwards and sandwiching the pre-formed layers with different compositions, and at least one of the preformed film layers having electrochromic properties and at least one layer having electrolytic properties.

9. An electrochromic device formed by assembling a pair of substrates having conductive coatings with preformed film layers formed independently of the conductively coated substrate, wherein the device is assembled with the conductive coatings of the substrates facing inwards and sandwiching at least three pre-formed layers with different compositions, and at least one of these pre-formed layers having anodic properties, another one of these pre-formed layers having electrolytic properties and another one of these pre-formed layers having cathodic properties.

10. A variable reflectivity automotive mirror formed by assembling a pair of bent substrates with a preformed multi layer film formed independently of the substrates, wherein the device is assembled with the substrates sandwiching the preformed multi layer film, and at least one of these pre-formed layers in the said film comprises a variable light modulating medium.

* * * * *